United States Patent
Kanai et al.

[11] Patent Number: 6,123,780
[45] Date of Patent: Sep. 26, 2000

[54] SPIN VALVE MAGNETORESISTIVE HEAD AND MANUFACTURING METHOD THEREFOR

[75] Inventors: Hitoshi Kanai; Kenichi Aoshima; Kenichiro Yamada; Mitsumasa Okada; Eiji Shimizu; Junichi Kane, all of Kanagawa, Japan

[73] Assignee: Fujitsu Limited, Kawasaki, Japan

[21] Appl. No.: 09/006,977

[22] Filed: Jan. 14, 1998

[30] Foreign Application Priority Data

Sep. 19, 1997 [JP] Japan ................................ 9-254741

[51] Int. Cl.⁷ ........................................... C21D 1/04
[52] U.S. Cl. ............................................. 148/108; 148/121
[58] Field of Search .................................. 148/108, 121, 148/300, 315; 360/113; 29/603.08

[56] References Cited

U.S. PATENT DOCUMENTS 5,772,794   6/1998   Uno et al. ............................. 148/108

FOREIGN PATENT DOCUMENTS

| 5347013 | 12/1993 | Japan . |
| 6150259 | 5/1994 | Japan . |
| 8138216 | 5/1996 | Japan . |
| 8147634 | 6/1996 | Japan . |
| 8221719 | 8/1996 | Japan . |
| 922510 | 1/1997 | Japan . |

*Primary Examiner*—John Sheehan
*Assistant Examiner*—Andrew L. Oltmans
*Attorney, Agent, or Firm*—Greer, Burns & Crain, Ltd.

[57] ABSTRACT

A method for manufacturing a spin valve GMR head is describe in which a fixed magnetic layer of the head may maintain magnetization in a desired orientation. In one aspect of the invention, the method comprises steps of: forming a magnetic film including at least a free magnetic layer, a non-magnetic metallic layer, a fixed magnetic layer, and a magnetic domain control layer; subjecting the magnetic film to a first heat treatment under a magnetic field to enhance magnetic anisotropy of the free magnetic layer; and subjecting the magnetic film to a second heat treatment under a magnetic field and at a higher temperature than the maximum temperature applied in the processes that precede the second heat treatment, to fix the magnetization in the fixed magnetic layer. In anther aspect of the invention, the method comprises steps of: forming a magnetic film including a free magnetic layer, a non-magnetic metallic layer, a fixed magnetic layer, and a magnetic domain control layer; subjecting the magnetic film to a first heat treatment under a magnetic field to fix the magnetization in the fixed magnetic layer; subjecting the magnetic film to a second heat treatment under a magnetic field to enhance magnetic anisotropy of the free magnetic layer; and subjecting the magnetic film to a third heat treatment in the absence of an externally applied magnetic field.

10 Claims, 8 Drawing Sheets

(PRIOR ART)

F I G. 7
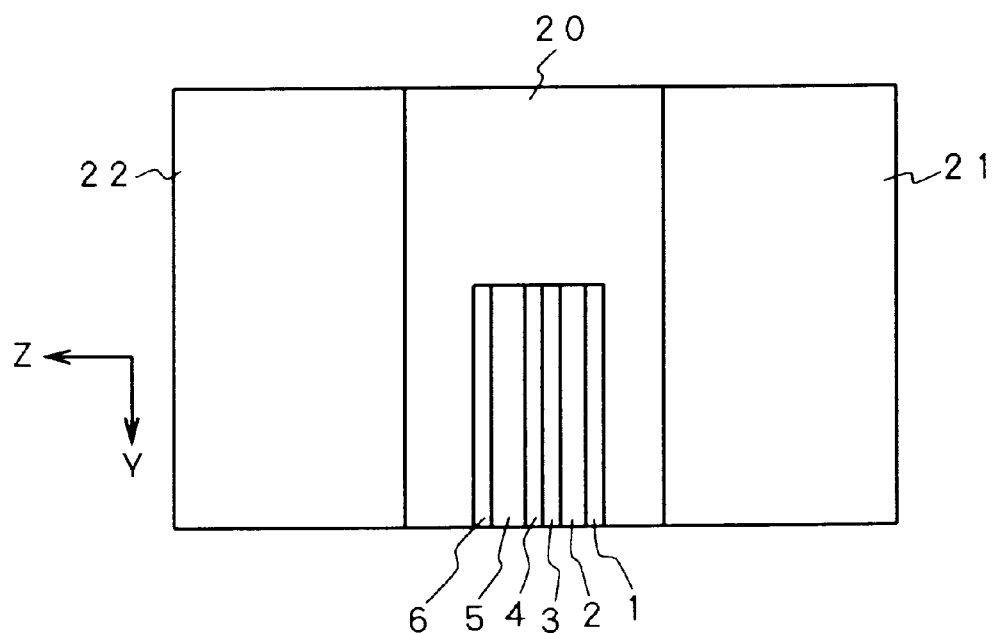

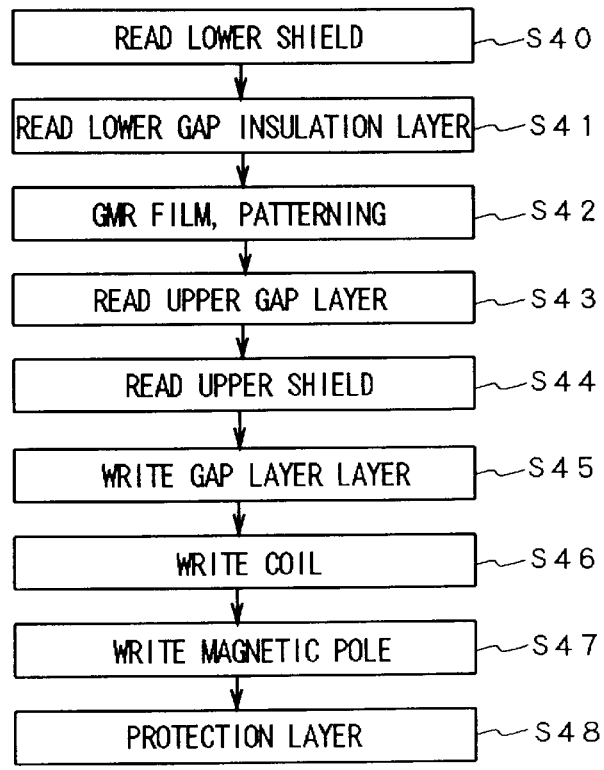
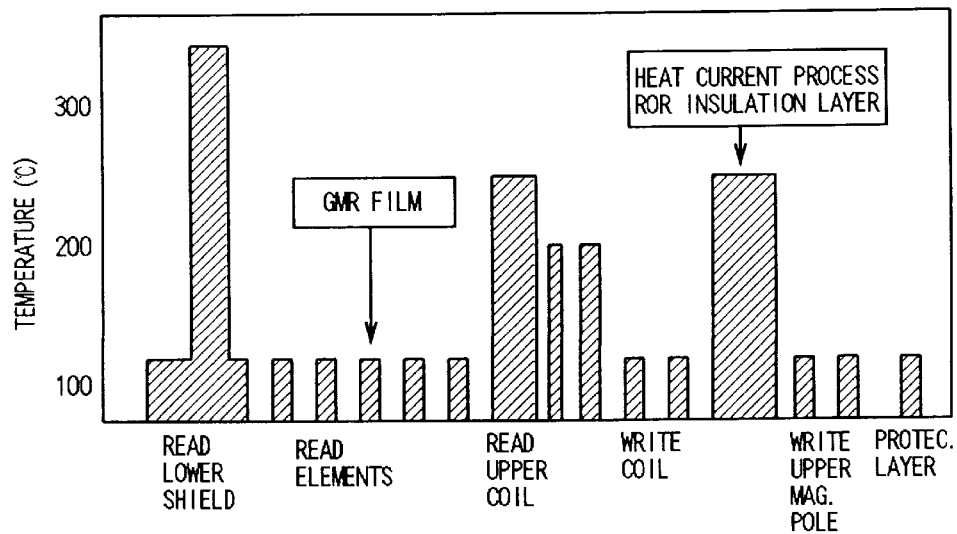

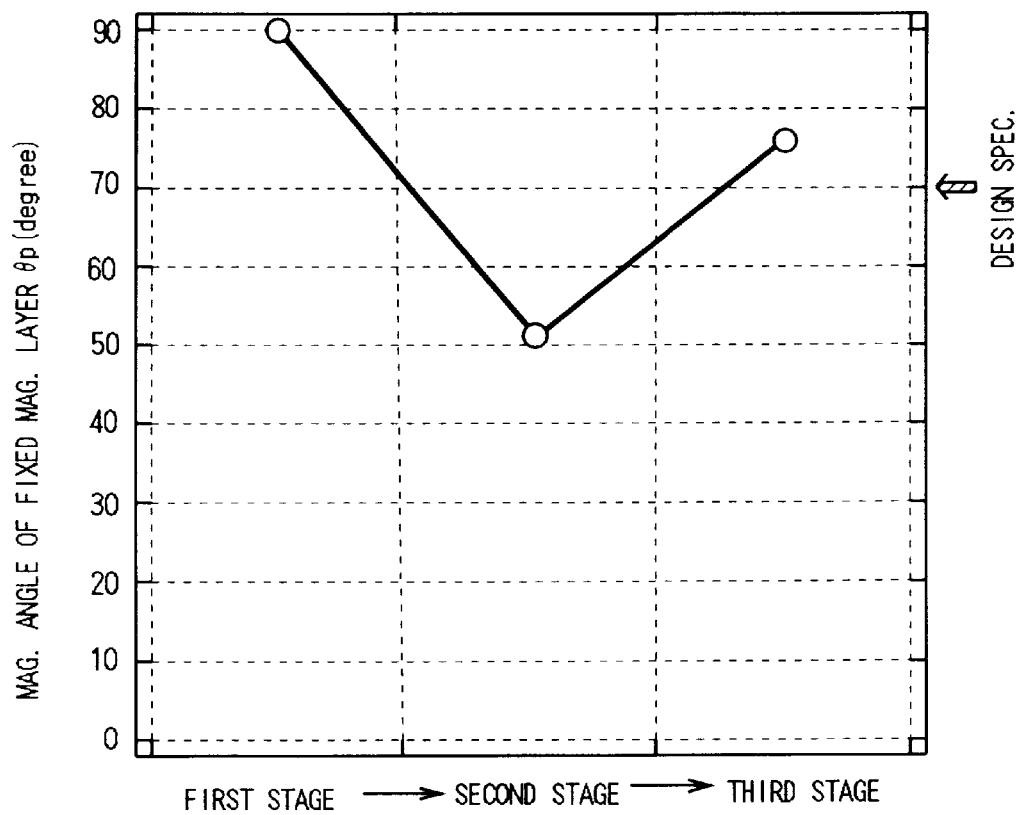
F I G. 1 1

SPIN VALVE MAGNETORESISTIVE HEAD AND MANUFACTURING METHOD THEREFOR

BACKGROUND OF THE INVENTION

1. Field of the Invention

The invention relates to a method for manufacturing a spin valve magnetoresistive head, and such head and a composite magnetic head manufactured by the method.

2. Description of Related Arts

In 1996, data recording density on a hard magnetic disk (HDD) exceeded 1 G bits/inch$^2$. The success for such a high density recording was achieved by the development of a magnetoresistive (MR) head which enabled a higher read output power than then conventional thin film heads. The data recording density of a HDD has been still increasing with a surprising speed of 60% per year. In order to support this growth rate, further development of a magnetic head having a superior sensitivity is inevitable.

Under such circumstances, giant magnetoresistive films (hereinafter referred to as GMR film) have been noted as a promising candidate for the magnetic head because they can provide a large read signal. Of the various giant magnetoresistive films, a spin valve magnetoresistive film is the most promising since it is simple in structure and hence relatively easy to manufacture, and yet it may exhibit a large electric resistance change under a weak externally applied magnetic field compared to ordinary MR elements.

An MR head uses an MR film as a read head element, whose electric resistance may change under the influence of an externally applied magnetic field. Information recorded on the HDD may be detected by detecting the change in electric voltage caused by the electric resistance change of the MR head due to the external magnetic field from a HDD indicative of the information. A GMR head utilize GMR film instead of MR film.

A typical magnetoresistive head utilizes a spin valve magnetoresistive film (hereinafter referred to as spin valve GMR head), as disclosed for example in U.S. Pat. No. 5,206,590, Japanese Patent Publication Laid Open No. 6-60,336, and French Patent No. 95-5,699.

FIG. 1 illustrates such a prior art spin valve GMR head as mentioned above, showing in perspective view a major portion of the head. FIG. 2 shows a vertical cross section of the spin valve GMR head shown in FIG. 1.

The spin valve GMR head has a GMR film which is formed, in the order shown in FIG. 1, by the deposition of:

a under layer 11 of tantalum (Ta);

a dual free magnetic layer 12 which consists of a first free magnetic layer 12a of a nickel-iron alloy (NiFe) and a second free magnetic layer 12b of a cobalt-iron-boron alloy (CoFeB);

a non-magnetic metallic layer 13 of copper (Cu), a fixed magnetic layer 14 of a cobalt-iron-boron alloy (CoFeB), an anti-ferromagnetic layer 15 made of regular metals such as palladium-platinum-manganese (PdPtMn), and a cap layer 16 made of tantalum (Ta).

After these layers 11 through 16 are formed, the GMR film is subjected to a process for patterning the film into a generally planar configuration, and is provided with a pair of gold electrodes (Au) 17a and 17b on the opposite corners of the top most cap layer 16, resulting in a spin valve GMR head. In such spin valve GMR head, a region between the two electrodes 17a and 17b serves as a signal detection region (or sense region) S. In the specification of the present application, in order to specify the direction of an externally applied magnetic field applied to the GMR head, a coordinate system is defined such that Z axis is taken along the thickness of the GMR film, Y axis along the line passing through the two electrodes, and X axis in the direction perpendicular to the Y-Z plane, as shown in FIG. 1.

During the operation of the spin valve GMR head, a sense current Is is passed through the sense region S from the electrodes 17a to the electrode 17b. With this current, if the spin valve GMR head is in motion, near a magnetic recording medium (not shown) such as a magnetic disk for example, relative to the magnetic medium, the electric resistance of the spin valve GMR head is changed in response to the X component of the magnetic field Hsig indicative of a signal from the magnetic medium, resulting in a varying voltage across the spin valve GMR head which is the product of the varying resistance and the sense current. Thus, the signal magnetic field is detected in the form of the voltage change. In order to make the magnetic response of the spin valve GMR film (i.e. magnetoresistance of the spin valve GMR film) linear with the signal magnetic field Hsig, magnetization Mp of the fixed magnetic layer 14 is generally fixed in the direction of X axis by means of an exchange coupling with the anti-ferromagnetic layer 15. In the absence of signal magnetic field Hsig, magnetization Mf of the free magnetic layer 12 is directed along Y axis which is perpendicular to the magnetization in the fixed magnetic layer 14. The direction of the magnetization in the free magnetic layer 12 with zero signal magnetic field, which is now oriented in the direction of Y axis, is called direction of easy magnetization. The magnetization Mf of the free magnetization layer 12 is adapted to rotate in response to an externally applied field such as a signal magnetic field Hsig from the magnetic recording medium such that the resultant magnetoresistance change of the GMR film is linear with the signal magnetic field Hsig.

However, in the case where a regular anti-ferromagnetic material is used for the anti-ferromagnetic layer 15, as is the case for conventional spin valve GMR heads, it is necessary to heat treat the GMR film after the GMR film is formed to thereby fix the magnetization Mp of the fixed magnetization layer 14 in the direction of X axis, because regular metals may undergo a phase transition only at a relatively high temperature, changing their lattice structures from face centered cubic (FCC) lattice structure to favored Face Center tetragonal (FCT) structure for the fixation of the magnetization Mp. Such heat treatment is carried out under a magnetic field of about 2,500 Oersteds (Oe) after at least the layers 1 through 6 (from the under layer 1 to the cap layer 6) of the GMR film are formed.

In the next step, the GMR film is heat treated under the influence of an appropriate magnetic field directed in Y direction to enhance anisotropy of the magnetization Mf of the free magnetic layer 12.

Unfortunately, the heat treatment for enhancing the anisotropy of the magnetization Mf in the free magnetic layer 12 affects the magnetization Mp already set up in the fixed magnetic layer 14 in X direction, thereby disadvantageously disorienting the magnetization Mp, as shown in FIG. 3, away from X axis towards Y axis. For an ideal GMR film, the magnetization in the fixed magnetic layer 14 be fixed in the direction of X axis while the magnetization in the free magnetic layer 12 is directed along Y axis so that the two magnetizations are perpendicular to each other in the absence of any external signal magnetic field Hsig. Then the output of the spin valve GMR head would be a linear function of the input signal (or external signal magnetic field Hsig). However, if the magnetization in the fixed magnetic layer 14 is disorientated away from X axis towards Y axis from the beginning, the spin valve GMR head cannot provide a linear response to the externally applied magnetic field Hsig, and yields a distorted waveform of the output voltage.

As discussed above, the fixed magnetic layer 14 and the free magnetic layer 12 ideally have magnetizations perpendicular to each other in the spin valve GMR head in the absence of any externally applied magnetic field Hsig. In actuality, the angle between the two magnetizations of the fixed magnetic layer 14 and free magnetic layer 12 must be at least 70 degrees for any usable spin valve GMR head, as verified by examinations of many conventional spin valve GMR heads.

SUMMARY OF THE INVENTION

In view of these problems encountered in the prior art magnetic heads, the invention is directed to provide a spin valve GMR head which is capable of generating a substantially non-distorted output waveform in response to an external signal magnetic field Hsig.

The invention is further directed to provide a method for manufacturing a spin valve GMR head having a linear response to a given external signal magnetic field Hsig.

To this end, according to one aspect of the present invention, there is provided a method for manufacturing a spin valve GMR head which comprises steps of:

forming a film including at least a free magnetic layer, a non-magnetic metallic layer, a fixed magnetic layer, and a magnetic domain control layer;

subjecting the film to a first heat treatment under a magnetic field (referred to as first in-field heat treatment) to enhance magnetic anisotropy of the free magnetic layer; and subjecting the film to a second heat treatment under a magnetic field (referred to as second in-field heat treatment) and at a higher temperature than the maximum temperature used in the processes that precede the second heat treatment to fix the magnetization in the fixed magnetic layer.

The method of manufacturing a spin valve GMR head of the invention may include no extra heat treatment under a magnetic field after the second in-field heat treatment.

The temperature of the second in-field heat treatment may be determined on the basis of the maximum temperature, as described in detail later.

The temperature of the second in-field heat treatment is so selected that the angle between the magnetization directions of the free magnetic layer and the fixed magnetic layer satisfies a prescribed condition required by the spin valve GMR head, as described in more detail later.

In another aspect of the invention, there is provided a method for manufacturing a spin valve GMR head which comprises steps of:

forming a film including at least a free magnetic layer, a non-magnetic metallic layer, a fixed magnetic layer, and a magnetic domain control layer;

subjecting the film to a first heat treatment under a magnetic field (referred to as first in-field heat treatment) to fix the magnetization in the fixed magnetic layer;

subjecting the film to a second heat treatment under a magnetic field (referred to as a second in-field heat treatment) to enhance magnetic anisotropy of the free magnetic layer; and subjecting the film to a third heat treatment in the absence of an externally applied magnetic field (referred to as field-free heat treatment).

The method of the invention may be carried out in such a way that the temperature and/or the duration of the third heat treatment is selected such that the magnetization directions in the free magnetic layer and the fixed magnetic layer make an angle exceeding a predetermined value required for the spin valve GMR head.

As discussed previously, misalignment or disorientation of the magnetization in the fixed magnetic layer 4 away from the intended direction along X axis towards Y axis arises from the heat treatment applied during the manufacture or during the in-field heat treatments of the spin valve GMR film, which misalignment in turn causes a nonlinearity of magnetoresistance of the spin valve GMR head in response to signal magnetic field Hsig. The method of manufacturing a spin valve GMR head according to the invention may advantageously alleviate such prior art problem by fixing the magnetization direction within a prescribed range with respect to the magnetization in the free magnetic layer.

A spin valve GMR head of the invention is manufactured by the method as described above.

A composite spin valve GMR head of the invention includes, as a read transducer, a spin valve GMR head manufactured by the method mentioned above along with an inductive write head.

BRIEF DESCRIPTION OF THE DRAWINGS

FIG. 7 shows a spin valve GMR head as viewed from a recording medium.

FIG. 8 is a flow diagram showing steps of manufacturing a composite magnetic head shown in FIG. 8.

FIG. 9 is a graphical representation of temperatures used in the respective processes of manufacturing a composite magnetic head shown in FIG. 8.

FIG. 11 is a graph illustrating how the orientation of the magnetization is restored in the fixed magnetic layer by a field-free heat treatment in the second example of the invention.

DETAILED DESCRIPTION OF THE PREFERRED EMBODIMENT

Preferred embodiments of the invention will now be described in detail by way of example with reference to the accompanying drawings.

Although the present invention is concerned mainly with a method of manufacturing a spin valve GMR head, we start with describing the spin valve GMR head manufactured by the method of the invention in order to make the description thereof more comprehensive to the reader, and thereafter the method will be described by way of a first and a second example of the invention.

[Spin Valve GMR Head]

Figure 1:
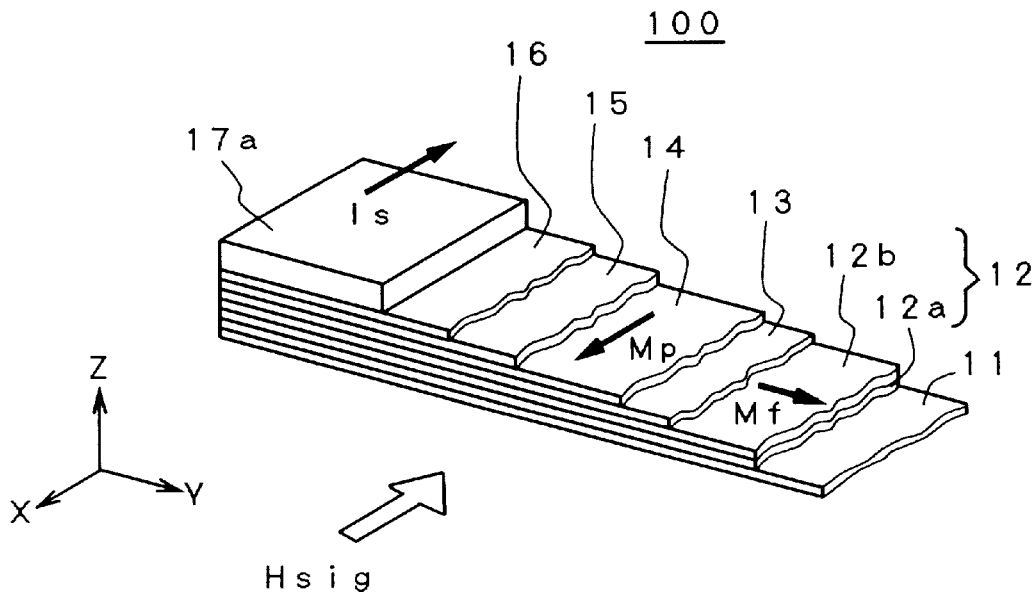
FIG. 1 is a perspective view of a major portion of a prior art spin valve GMR head.
Figure 2:
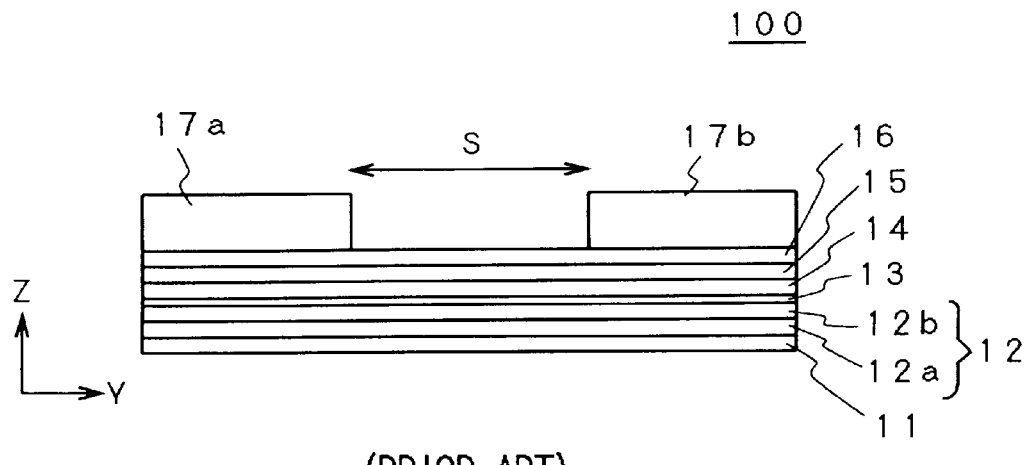
FIG. 2 is a cross sectional view of the spin valve GMR head shown in FIG. 1.
Figure 3:
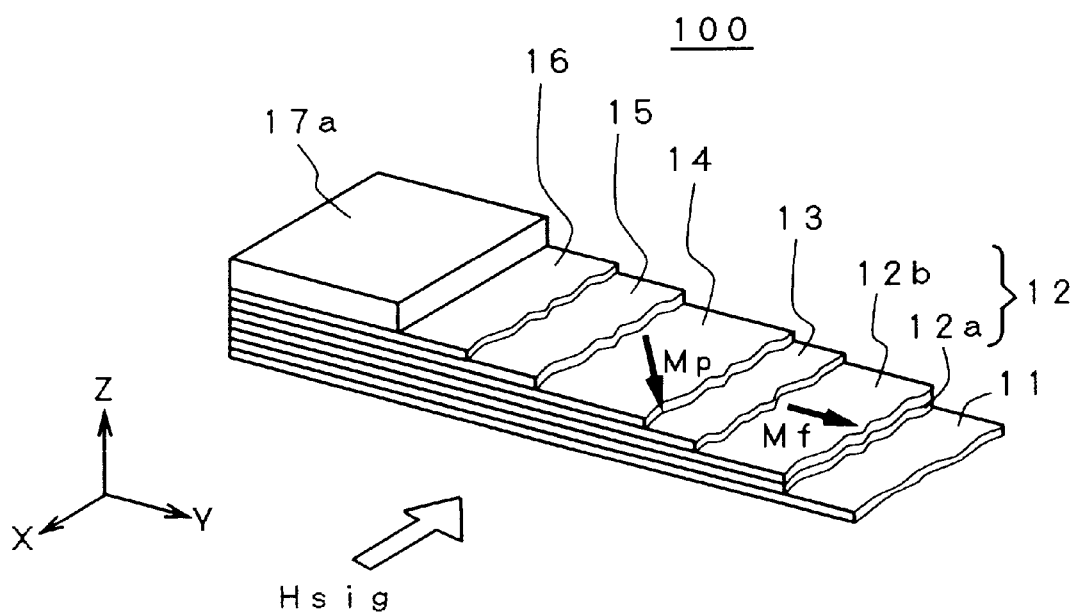
FIG. 3 illustrates a figure useful in explaining the orientation of the magnetization in the fixed magnetic layer of the spin valve GMR head shown in FIG. 1.
Figure 4:
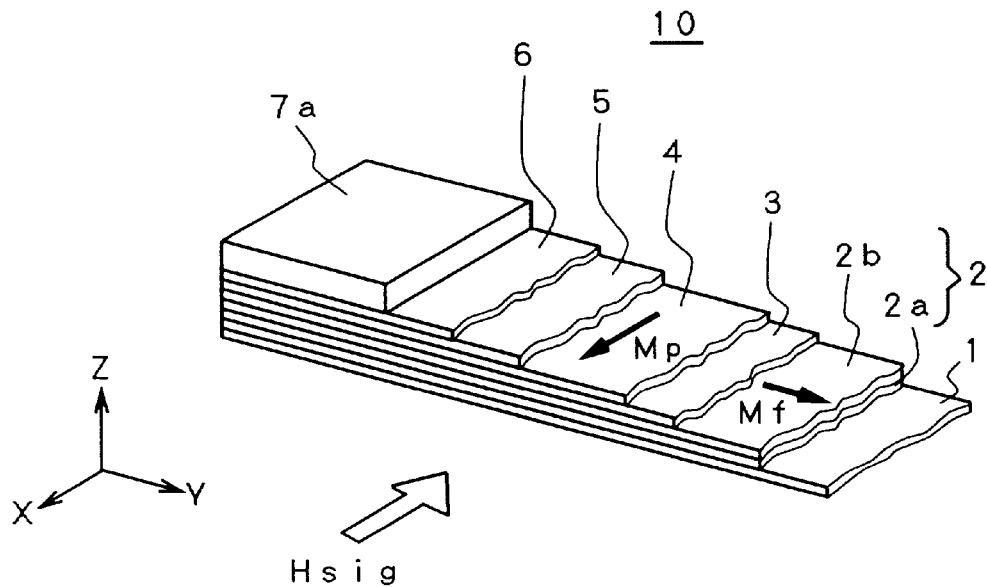
FIG. 4 is a perspective view of a major portion of the spin valve GMR head according to the invention.
Figure 5:
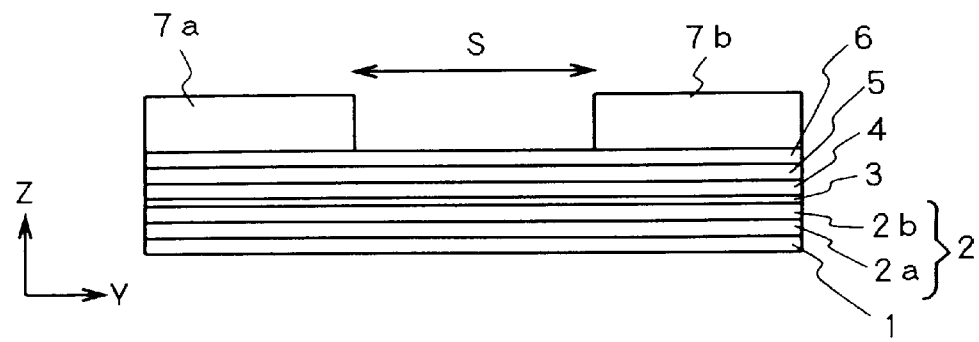
FIG. 5 is a cross sectional view of the spin valve GMR head shown in FIG. 4.

Referring now to FIG. 4, there is shown in perspective view a major portion of a spin valve GMR head manufactured by a method according to the invention. The spin valve GMR head comprises:

a under layer 1;

a first free magnetic layer 2a formed on the under layer 1;

a second free magnetic layer 2b formed on the first free magnetic layer 2a;

a non-magnetic metallic layer 3 formed on the second free magnetic layer 2b;

a fixed magnetic layer 4 of formed on the non-magnetic metallic layer 3;

a magnetic domain control layer 5 of a regular metal and formed on the fixed magnetic layer 4;

a cap layer 6 formed on the magnetic domain control layer 5; and a pair of electrode terminals 7a and 7b formed on and near the opposite ends of the cap layer 6.

The magnetic domain control layer 5 may be either an anti-ferromagnetic layer or a hard magnetic layer. In the example shown herein below, the magnetic domain control layer 5 is anti-ferromagnetic.

Details of the spin valve GMR head is as follows.

The under layer 1 can be a layer of tantalum (Ta), for example, having a thickness of about 50 Angstroms.

The free magnetic layer 2a may be a FeNi layer of about 35 Angstroms, the free magnetic layer 2b a CoFeB layer of about 40 Angstroms, the two layers together forming a free magnetic layer 2.

It should be noted that the free magnetic layer 2 has a dual layer structure of NiFe and CoFeB, for the following two reasons. One reasons is to prevent the spin valve GMR head from loosing its resistance drastically due to a heat treatment above 200° C. during a process of manufacturing the spin valve GMR head. Such heat treatment causes destruction of the NiFe layer caused by mixing of the Ni atoms in the NiFe layer and Cu atoms in the adjacent non-magnetic copper layer. The destruction can take place if, as with early spin valve GMR head, the NiFe layer is in direct contact with the non-magnetic copper layer. Thus, in order to prevent such destruction to occur, a second free magnetic layer 2b of CoFeB is inserted, instead of Cu layer, in the interface between the NiFe layer and the Cu layer. This CoFeB layer will not get mixed with the third non-magnetic metallic layer of Cu. It should be noted that the coercivity of a magnetic material is generally anisotropic with respect to the crystal axes of the material, so that, if a layer such as NiFe layer 2a having a relatively small coercivity is provided in the manner as describe above, the CoFeB layer 2b may have its magnetization oriented in the (1,1,1) plane, and will have a reduced coercivity. In addition, by employing the NiFe layer 2a on the CoFeB layer 2b having a relatively large coercivity, the mobility of the magnetic domains in the free magnetic layer 2 is enhanced.

The non-magnetic metallic layer 3 may be a 32 Angstroms thick Cu layer, for example.

The fixed magnetic layer 4 may be, like the free magnetic layer 2b, a CoFeB layer which is about 30 Angstroms thick.

The anti-ferromagnetic layer 5 is preferably made of a material having a high exchange coupling magnetic field as well as a high blocking temperature and good anti-corrosive property. A magnetic material may be magnetized by bringing it near another magnetized material. Such magnetic interaction is generally called as exchange coupling, and the resultant magnetic field as exchange coupling field.

A magnetic layer such as the fixed magnetic layer 4 disposed in contact with the anti-ferromagnetic layer 5 has a magnetization which is fixed in the direction of the anti-ferromagnetic layer 5. Thus, the magnetic layer 4 is called fixed or pinned magnetic layer. On the other hand, the free magnetic layer 2 has a weak coercive force and is separated from the anti-ferromagnetic layer 5 by the non-magnetic metallic layer 3, so that its magnetization is not pinned. Hence, the layer 2 is called free magnetic layer. In short, the pinned layer 4 has a large coercive force and maintains a fixed magnetization direction once it is magnetized in that direction, while the free magnetic layer 2 has a relatively small coercive force and may have a variable magnetization direction.

The anti-ferromagnetic layer 5 may be formed, for example, of such a regular metal having a thickness of at least 150 Angstroms, typically about 250 Angstroms as a palladium-platinum-manganese (PdPtMn) alloy, a palladium-Manganese (PdMn) alloy, a chromium-manganese (CrMn) alloy. Early spin valve GMR heads utilized FeMn alloys, which are, however, disadvantageously corrosive. In order to circumvent such drawbacks, Manganese alloys containing a noble metal such as platinum as mentioned above may be used. The regular metals have relatively high phase transition temperature. In the example shown herein, the anti-ferromagnetic layer 5 is typically made of a PdPtMn alloy having a blocking temperature (defined as the temperature at which exchange magnetic field becomes zero) of about 320° C.

The cap layer 6 may be a tantalum (Ta) layer having a thickness of about 70 Angstroms.

The pair of the electrodes 7a and 7b are made of any conductive material, for example gold, of a thickness of about 1,000 Angstroms.

A basic structure of the spin valve GMR head is shown in FIG. 4. The spin valve GMR head has a feature that it has a four-layered structure including a dual set of the magnetic layers 2 and 4, the thin non-magnetic layer 3 separating the dual magnetic layers 2 and 4, and the anti-ferromagnetic layer 5 formed on top of the upper one magnetic layer 4) of the dual magnetic layers. It has been known that GMR effect may arise in super-lattice GMR layers, granular GMR layers, and spin valve layers in different ways depending on the particular multi-layer structure of a GMR layer used. The mechanism of the GMR effect depends on the structure of the GMR layer. The spin valve GMR layer of the example shown herein has a feature that it is structurally simple and suited for mass production, and that it may exhibit a high resistance change for a weak magnetic field.

The operation of the spin valve GMR head shown in FIG. 4 will be now described briefly below. As described above, the spin valve GMR layer basically has the four-layered structure. The fixed magnetic layer 4 in contact with the anti-ferromagnetic layer 5 has a fixed magnetization Mp in direction along the X axis, which will not be changed if an externally applied weak magnetic field is applied thereto. On the other hand, the free magnetic layer 2 has a magnetization Mf which is oriented in the direction of the Y axis in the absence of an externally applied magnetic field but may be easily reoriented in a different direction by an externally applied weak magnetic field such as a signal magnetic field applied thereto.

Supposing now that an externally applied weak magnetic field Hsig is applied to the head, the magnetization in the free magnetic layer 2 is rotated to the direction of the field Hsig, resulting in a change in resistance (referred to as magnetoresistance) of the GMR layer by a magnitude which is determined by the relative angle θ between the fixed magnetic layer 4 and the free magnetic layer 2. Specifically, the change is proportional to cos θ. Thus, when the angle is 180 degrees, the change in resistance is maximum. The resistance is attributed to the scattering of the electrons that flow from the free magnetic layer 2 to the anti-ferromagnetic fixed layer 5 or vise versa across the interfaces between the free magnetic layer 2 and the non-magnetic metallic layer 3, and between the non-magnetic metallic layer 3 and the fixed magnetic layer 4. When the orientations of the magnetizations in adjacent layers are identical, such scattering of electrons are not greatly reduced, and then accordingly the resistance becomes minimum. The value of the magnetoresistance of a GMR film depends on the GMR layers constituting the film as well as the thicknesses of the GMR layers, and varies normally in the range of a few percent to about 15%.

Figure 6:
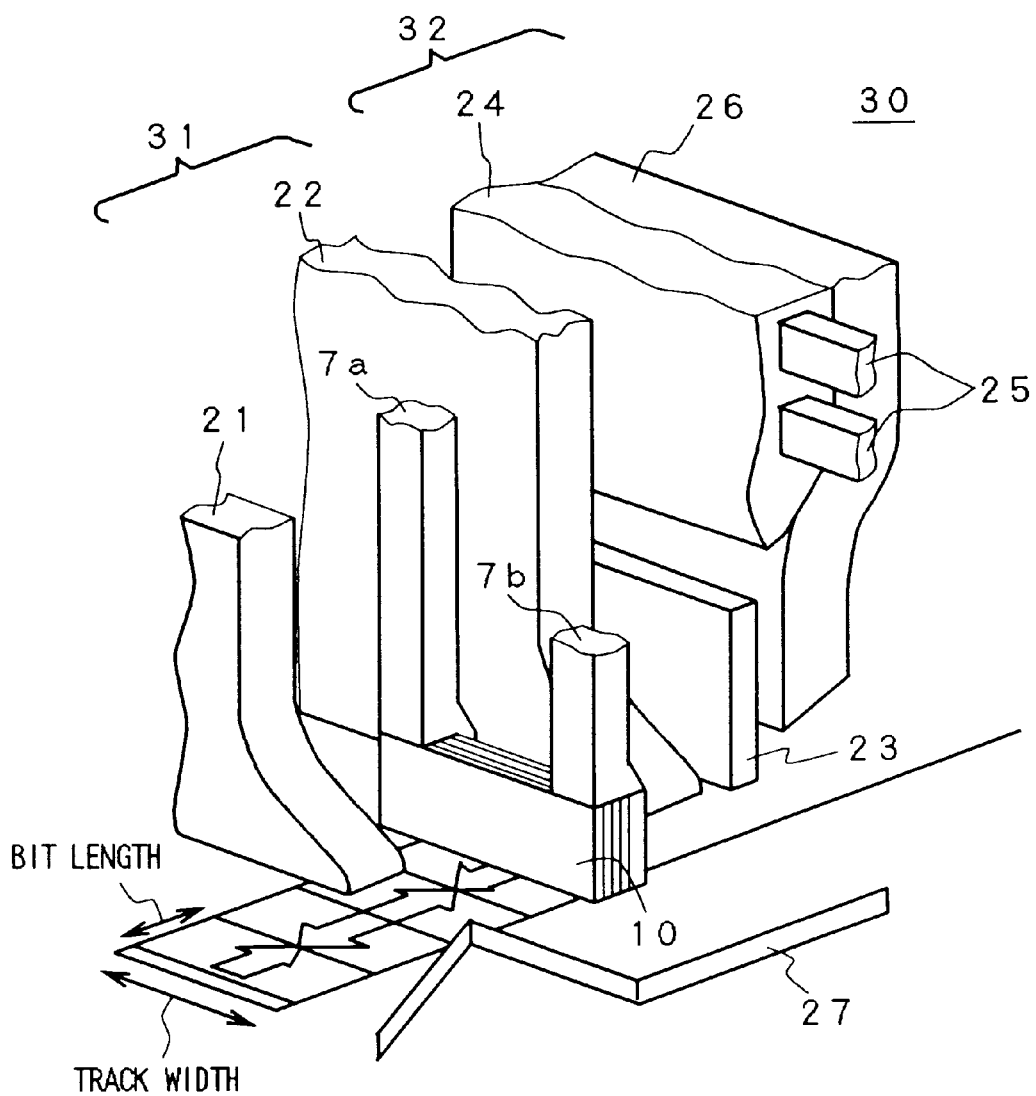
FIG. 6 shows a major portion of a composite magnetic head comprising a spin valve GMR head and an inductive magnetic head.

FIG. 6 shows a general perspective view of a composite magnetic head 30 mounted on a hard disk drive and equipped with a spin valve GMR head 10. The magnetic head 30 is positioned above a magnetic recording medium 27 such as a hard disk. The spin valve GMR head 10 as described with reference to FIG. 4 is used as a read head 31 in the composite magnetic head 30. The composite magnetic head 30 consists mainly of the read head 31 and a write head 32. The composite head 30 is called "merge type", as it has an upper shield 22 of the read head 31 also functioning as a lower magnet (or lower core) of the write head 32. This composite magnetic head 30 has a so-called "piggy back structure", which implies that the write head 32 is mounted on the backside of the read head 31.

As shown in FIG. 6, the read head 31 comprises, along with the spin valve GMR film and the electrodes 7a and 7b, a read lower shield 21, and an read upper shields 22 disposed respectively on the opposite sides of the electrodes 7a and 7b.

The write head 32 comprises a write coil 25, an organic insulation layer 24, a write lower magnet 22 and a write upper magnets 26 situated on the opposite sides of the organic insulation layer 24. The read lower shield 22 and the write lower magnet 22 are the same element functioning as one or the other of these elements for read/write operation. The write lower magnet 22 and the write upper magnet 26 are spaced apart from each other. The organic insulation layer 24 and a gap insulation layer 23 are fixedly disposed between the write lower and upper magnets 22 and 23, respectively. The write coil 25 is embedded in the organic insulation layer 24.

The composite magnetic head 30 is thus integrally formed of the read head 31 and the write head 32.

FIG. 7 shows an end view of the read head 31 as viewed from the recording medium 27. It is seen in the figure that a gap insulation layer 20 is disposed between the read lower shield 21 and the read upper shield 22, and that the GMR layer is placed in a window formed in the gap insulation layer 20.

Referring now to FIG. 8, steps of manufacturing the composite magnetic head shown in FIG. 6 will be described briefly.

First, in Step S40, the read lower shield layer 21 is fabricated. The read lower shield 21 is made of FeN, for example.

In the next Step S41, the read lower gap insulation layer is formed. The read lower gap insulation layer is made of aluminum, for example.

In Step S42, the spin valve GMR film as described in connection with FIG. 4 is formed, which is then patterned to form the electrodes 7a and 7b. This may be done, for example, by first depositing in the order mentioned the under layer 1, the first free magnetic layer 2a, the second free magnetic layer 2b, the non-magnetic metallic layer 3, the fixed magnetic layer 4, the anti-ferromagnetic layer 5, the cap layer 6, using, for example, a sputtering technique. Second, the multi-layered GMR film is patterned using a standard lithographic technique to form a planar rectangular object, which is then further provided with the pair of the electrodes 7a and 7b formed on, and at the opposite ends, of the top surface of the cap layer 6.

In the following Step S43, a read upper gap layer is formed.

In Step S44, the read upper shield 22 is formed. The read upper shield 22 may be made of NiFe.

In Step S45, a write gap layer is formed.

In Step S46, the write coil 25 is fabricated.

In Step S47, the upper write magnet pole 26 is formed.

In Step S48, protection layer is formed.

The manufacturing steps shown in FIG. 8 involve a number of heating processes, as depicted in FIG. 9. Among these heating processes, a heat curing process for curing the organic insulation layer 24 filling a region around the write coil 25 after the formation of the GMR film affects the orientation of the fixed magnetization in the fixed magnetic layer 4. This heat curing process is generally carried out at temperatures in the range of 230–250° C. for three hours.

The heat curing process causes a problem that, contrary to expectation, the heat undesirably disoriented the magnetization Mp in the fixed magnetic layer 4 away from the intended direction along the X axis towards the Y axis. However, this problem may be circumvented in accordance with the principle of the invention, as described in the following examples.

FIRST EXAMPLE

In a first method of manufacturing a spin valve GMR head according to the invention, a two staged heat treatment is carried out subsequent to the formation of the spin valve GMR film, preferably after the aforementioned heat curing process of the organic insulation layer 24. In the first stage, the heat treatment is carried out by heating the spin valve GMR film at 230° C. for example, under the influence of a magnetic field (which will be referred to as in-field heat treatment) of about 2,500 Oe directed along the Y axis, using an appropriate magnetic source, to thereby enhance magnetic anisotropy of the free magnetic layer 2 in the direction of Y axis. In the second stage, the spin valve GMR film is subjected to a second in-field heat treatment under the influence of a magnetic field of about 2,500 Oe, for example, directed along the X axis, to thereby re-orient and fix the magnetization Mp along the X axis in the fixed magnetic layer 4, in which the spin valve GMR film is heated to a temperature that exceeds the maximum precedent temperature which is defined as the maximum temperature involved in the processes that precede the second in-field heat treatment.

Figure 10:
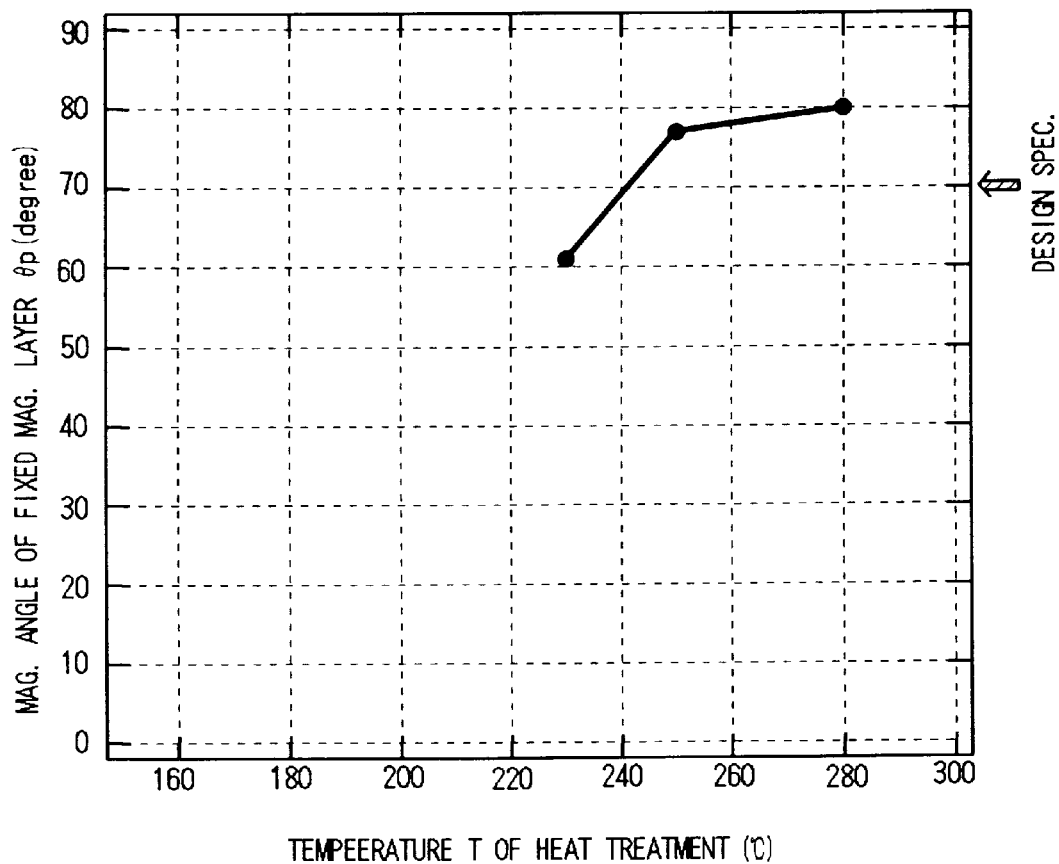
FIG. 10 is a graphical representation of the temperatures for the in-field heat treatments in setting up a fixed magnetization in the fixed magnetic layer of the first example of the invention.

FIG. 10 shows the magnetization Mp restored in the second heat treatment in terms of the direction θ p of the magnetization Mp in reference to the Y axis (i.e. the direction of the free magnetic layer 2 in the absence of an externally applied magnetic field). The magnetization angle θ p is plotted as a function of the temperature T of the second heat treatment for the case where temperature of the first heat treatment (which is the maximum precedent temperature) is 230° C. The angle is ideally 90 degrees in the absence of any externally applied magnetic field. The minimum permissible magnetization angle (or design specification of magnetization angle) is 70 degrees.

FIG. 10 shows that, given the maximum precedent temperature of 230° C., the magnetization angle θ p of the fixed magnetic layer is restored to about 62 degrees by the second heat treatment at 230° C., and to about 77 degrees by the second heat treatment at 250° C., and to about 80 degrees by the second heat treatment at 280° C. Hence, if the maximum precedent temperature is 230° C., the temperature of the second heat treatment for restoring the minimum permissible magnetization angle (ie. θ p≧70°) is determined to be 242° C. It would be appreciated that the second heat treatment at a still higher heating temperature 250° C. say, will bring a better magnetization angle θ p, and that the temperature of 280° C. is still better to this end.

It should be noted that, the higher the maximum precedent temperature, the higher the temperature to restore the minimum permissible magnetization angle of 70°, so that the temperature of the second heat treatment is determined by the maximum precedent temperature.

Subsequent to the second in-field magnetic heat treatment for the fixed magnetic layer 4, it is preferable not to apply any in-field heat treatment. After the second in-field heat treatment, should any heat treatment for the organic insulation layer 24 be needed, the heat treatment should be done in the absence of a magnetic field. Then the magnetization in the fixed magnetic layer 4 will be kept at an angle greater than the minimum design magnetization angle mentioned above, and the spin valve GMR head will maintain a linear response to the signal magnetic field Hsig.

SECOND EXAMPLE

In the second method of manufacturing a spin valve GMR head according to the invention, a heat treatment is carried out in three stages after the spin valve GMR film is formed, as described below. In the first stage, the spin valve GMR film is given an in-field heat treatment to fix the magnetization in the fixed magnetic layer 4 in the direction of the X axis. This in-field heat treatment involves heating the spin valve GMR film at 280° C. for example, in a magnetic field of 2,500 Oe oriented in the direction of the X axis using an appropriate source of magnetic field. In the second stage, another in-field heat treatment is given to the spin valve GMR film to enhance the magnetic anisotropy of the free magnetic layer 2 in the direction of Y axis. In this heat treatment, the spin valve GMR film is heated to 230° C. for example, in a magnetic field of about 2,500 Oe orienting in the direction of the Y axis.

In the third stage, a further heat treatment is applied to the spin valve GMR film without any magnetic field.

FIG. 11 illustrated the magnetization angle θ p in the fixed magnetic layer 4 after the corresponding heat treatments. It is seen in the figure that after the fixation of the magnetization direction in the fixed magnetic layer 4 by the first heat treatment, the magnetization angle θ p in the fixed magnetic layer is ideally 90° with respect to the Y axis. After the heat treatment for enhancing the magnetic anisotropy of the free magnetic layer in the second heat treatment, the magnetization angle θ p of the fixed magnetic layer 4 is reduced to about 52° due to the heat in the heat treatment. At this stage, the GMR head cannot meet the requirement for the minimum magnetic angle of 70°, and hence will fail to provide necessary output characteristics. However, after the third heat treatment, the magnetization angle θ p is restored to about 76°.

Through the experiments, it has been observed by the inventors that the restoration of the magnetization angle is promoted by the third heat treatment at a higher temperature and/or by a prolonged heating time. Thus, the magnetization angle may be restored well above 76 degrees if desired.

In the preferred embodiments described above, the first and the second examples of manufacturing a spin valve GMR head according to the invention have been described. It should be understood, however, that the order of the heat treatments is not limitative. In fact, when the heat treatment for enhancing the anisotropy of the free magnetic layer is first applied to the GMR film formed in the preceding processes, an in-field heat treatment for the fixation of the fixed magnetic layer may be applied at a temperature above the maximum precedent temperature, as discussed in the first example of the invention. In this case, it is preferable to apply no more in-field heat treatment. An alternative way is to apply the heat treatment for the fixation of the fixed magnetic layer first, followed by the heat treatment for the enhancement of the anisotropy of the free magnetic layer and the field-free heat treatment for the recovery of the magnetization angle in the fixed magnetic layer, as discussed in the second example of the invention.

The invention described above may advantageously provide a spin valve GMR head which has a linear response to a given external signal magnetic field Hsig, thereby generating a substantially non-distorted output waveform. The invention may further provide a method for manufacturing such spin valve GMR head.

Inasmuch as the present invention is subject to many variations, modifications and changes in detail, it is intended that the subject matter discussed above and shown in the accompanying drawings may be interpreted as illustrative not in a limiting sense. Other possible modifications of the described embodiment will readily occur to a person skilled in the art. For example, various combinations of materials and thicknesses are possible for the constituent layers of the spin valve GMR film. Variations in such manufacturing parameters for the spin valve GMR film as temperatures, durations of the processes are also possible within the scope of the invention.

What we claim is:

1. A method for manufacturing a spin valve GMR head, comprising steps of:
    forming a film including at least a free magnetic layer, a non-magnetic metallic layer, a fixed magnetic layer, and a magnetic domain control layer;
    subjecting said film to a first heat treatment under a magnetic field to enhance magnetic anisotropy of said free magnetic layer; and
    subjecting said film to a second heat treatment under a magnetic field and at a temperature that is higher than the maximum temperature used in the processes that precede said second heat treatment to fix the magnetization in said fixed magnetic layer;
    wherein the temperature of said first heat treatment is about 230° and the temperature of said second heat treatment is about 250°.

2. The method of manufacturing a spin valve GMR head according to claim 1, wherein said film is subjected to no further heat treatment under a magnetic field after said second heat treatment.

3. The method of manufacturing a spin valve GMR head according to claim 1, wherein the temperature of said second heat treatment is so selected that the angle between the magnetization directions in said free magnetic layer and in said fixed magnetic layer satisfies a prescribed condition required by said spin valve GMR head.

4. A method for manufacturing a spin valve GMR head, comprising steps of:

forming a film including at least a free magnetic layer, a non-magnetic metallic layer, a fixed magnetic layer, and a magnetic domain control layer;

subjecting said film to a first heat treatment under a magnetic field to fix the magnetization in said fixed magnetic layer;

subjecting said film to a second heat treatment under a magnetic field to enhance magnetic anisotropy of said free magnetic layer; and subjecting said film to a third heat treatment in the absence of an externally applied magnetic field.

5. The method of manufacturing a spin valve GMR head according to claim 4, wherein the temperature of said field-free heat treatment is so selected that the angle between the magnetization directions in said free magnetic layer and in said fixed magnetic layer satisfies a prescribed condition required by said spin valve GMR head.

6. The method of manufacturing a spin valve GMR head according to claim 4, wherein the duration of said third heat treatment is so selected that the angle between the magnetization directions in said free magnetic layer and in said fixed magnetic layer satisfies a prescribed condition required by said spin valve GMR head.

7. The method of manufacturing a spin valve GMR head according to claim 4, wherein the temperature and the duration of said third heat treatment are so selected that the angle between the magnetization directions in said free magnetic layer and in said fixed magnetic layer satisfies a prescribed condition required by said spin valve GMR head.

8. The method of manufacturing a spin valve GMR head according to any one of claims 1, 2, 3, and 4, wherein:

said free magnetic layer includes a nickel-iron (NiFe) layer and a cobalt-iron-boron (CoFeB) layer;

said non-magnetic layer includes a layer containing copper; and said fixed magnetic layer includes two cobalt-iron-boron (CoFeB) layers.

9. The method of manufacturing a spin valve GMR head according to claim 8, wherein said magnetic domain control layer includes a manganese alloy.

10. The method of manufacturing a spin valve GMR head according to claim 9, wherein said magnetic domain control layer is an alloy selected from a group consisting of palladium-platinum-manganese alloy, platinum-manganese alloy, palladium-manganese alloy, nickel-manganese alloy, and chromium-manganese alloy.

* * * * *